United States Patent
Wawrzinek et al.

(10) Patent No.: US 9,469,534 B2
(45) Date of Patent: Oct. 18, 2016

(54) REFORMER TUBE AND APPARATUS AND ALSO PROCESS FOR PRODUCING A SYNTHESIS GAS

(71) Applicant: LINDE AKTIENGESELLSCHAFT, Munich (DE)

(72) Inventors: Klemens Wawrzinek, Munich (DE); Michael Nold, Wolfratshausen (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/568,825

(22) Filed: Dec. 12, 2014

(65) Prior Publication Data
US 2015/0166339 A1    Jun. 18, 2015

(30) Foreign Application Priority Data
Dec. 12, 2013   (DE) .................. 10 2013 020 856

(51) Int. Cl.
*C01B 3/40* (2006.01)
*C01B 3/38* (2006.01)
*B01J 8/06* (2006.01)
*B01J 8/00* (2006.01)

(52) U.S. Cl.
CPC ............... *C01B 3/384* (2013.01); *B01J 8/009* (2013.01); *B01J 8/067* (2013.01); *B01J 2208/0084* (2013.01); *C01B 2203/0233* (2013.01); *C01B 2203/041* (2013.01); *C01B 2203/1058* (2013.01)

(58) Field of Classification Search
CPC ............ C01B 2203/042; C01B 3/501; C01B 2203/0233; C01B 2203/1241; C01B 2203/0827; C01B 3/384; C01B 2203/146; C01B 2203/068; C01B 2203/1011; C01B 2203/0894; C01B 2203/1229; B01J 19/2475; B01J 8/009; B01J 2208/00504
See application file for complete search history.

(56) References Cited

U.S. PATENT DOCUMENTS

| | | | | |
|---|---|---|---|---|
| 4,340,501 | A | * | 7/1982 | Davidson ...................... 252/373 |
| 5,229,102 | A | * | 7/1993 | Minet et al. ................. 423/652 |

* cited by examiner

*Primary Examiner* — Stanley Silverman
*Assistant Examiner* — Syed Iqbal
(74) *Attorney, Agent, or Firm* — Millen, White, Zelano, Branigan, P.C.

(57) ABSTRACT

The present invention relates to a reformer tube for producing synthesis gas, e.g., hydrogen, and an apparatus and a process for producing synthesis gas, in particular hydrogen. The reformer tube is configured for directing the flow of starting materials and at least one reaction product in volume streams for the purpose of producing a synthesis gas. The reformer tube has in its interior at least one flow directing device having a first guide device for diverting a first partial volume stream in a direction having a radial component directed away from the longitudinal axis of the reformer tube, and having a second guide device for diverting a second partial volume stream in a direction having a radial component directed towards the longitudinal axis of the reformer tube.

19 Claims, 2 Drawing Sheets

REFORMER TUBE AND APPARATUS AND ALSO PROCESS FOR PRODUCING A SYNTHESIS GAS

The present invention relates to a reformer tube for producing synthesis gas, in particular for producing hydrogen, and also an apparatus and a process for producing synthesis gas, in particular for producing hydrogen.

Steam reformers are usually employed for producing synthesis gas and in particular for producing hydrogen. Such steam reformers are also used, inter alia, for producing carbon monoxide or other synthesis gases. Methane, natural gas, propane or butane usually serves as starting material. The actual reaction to produce the synthesis gas takes place in catalyst-filled tubes in which a feed gas having a temperature of from 500° C. to 900° C. or even more than 900° C. and very high pressure is converted in the presence of steam. Heating is usually achieved by means of a heat source outside the tubes, so that heat is introduced into the tube wall and the starting materials and the catalyst material are in this way heated in the tube. The higher the temperature of the tube wall or of the catalyst material in the vicinity of the tube wall, the more efficiently can a synthesis gas, for example hydrogen, be produced per unit time. However, in the case of reformer tubes having a particular size, there is the disadvantage that the heat introduced into the tube wall cannot be conducted or distributed into the central region of the tube, so that less starting materials react in this central region per unit time than in the outer region close to the wall. This also means that catalyst material arranged centrally in the reformer tube is utilized more inefficiently than the catalyst material close to the wall.

Proceeding from this background, it is an object of the present invention to provide a reformer tube and also an apparatus and a process for producing synthesis gas, in particular for producing hydrogen, by means of which efficient production of synthesis gas in a simple, inexpensive and reliable way is made possible.

Upon further study of the specification and appended claims, other objects, aspects and advantages of the invention will become apparent.

These objects are achieved by a reformer tube that has, within its interior, at least one flow directing device which comprises: (a) a first guide device for diverting a first partial volume stream in a direction having a radial component directed away from the longitudinal axis of the reformer tube; and (b) a second guide device for diverting a second partial volume stream in a direction having a radial component directed towards the longitudinal axis of the reformer tube.

Additionally, these objects are achieved by an apparatus for producing a synthesis gas comprising a reformer tube, as described above, a heating device for heating the reformer tube, and also a membrane for separating off the synthesis gas produced.

These objects are also achieved by a process of the invention for producing a synthesis gas wherein starting materials and at least one reaction product flow in volume streams through a reformer tube, as described above. A first partial volume stream is conducted by the first guide device of the flow directing device in a direction having a radial component directed away from the longitudinal axis of the reformer tube. A second partial volume stream is conducted by the second guide device of the flow directing device in a direction having a radial component directed towards the longitudinal axis of the reformer tube.

Additional advantageous embodiments of the reformer tube, apparatus, and process of the invention are described herein and in the dependent claims.

The reformer tube of the invention is configured for conducting the flow of starting materials and at least one reaction product in volume streams for the purpose of producing a synthesis gas, in particular for producing hydrogen, wherein the reformer tube has in its interior, at least one flow directing device having a first guide device for diverting a first partial volume stream in a direction having a radial component directed away from the longitudinal axis of the reformer tube and having a second guide device for diverting a second partial volume stream in a direction having a radial component directed towards the longitudinal axis of the reformer tube.

The reformer tube is designed for starting materials to flow through it and react in the reformer tube to form a synthesis gas, e.g., a hydrogen-rich synthesis gas. For this purpose, a catalyst material is arranged in the reformer tube. The interior of the reformer tube is the volume surrounded by the tube wall. The reformer tube does not necessarily have to have a round cross section but can also have cross-sectional shapes deviating therefrom. The first and second guide devices ensure that a first partial volume stream is conducted from the central region of the reformer tube in the direction of the interior wall of the tube and a second partial volume stream is conducted from the interior wall of the tube into the central region of the reformer tube. The flow direction induced by the respective guide device is preferably directed precisely radially in the cross section of the reformer tube.

An advantage of the reformer tube of the invention is, in particular, that the directing of the flow results in unconsumed starting materials being conveyed tightly along the interior wall of the tube, and synthesis gas formed at the interior wall of the tube being conducted away from the interior wall. Thus, starting materials are continually supplied to the zone of relatively high temperature at the interior wall of the tube and reaction product formed is diverted into the region in which lower conversion of the starting materials takes place, namely in or close to the central region of the reformer tube, which has a lower temperature. Apart from the lengthening of the flow path and, associated therewith, more efficient utilization of the catalyst material, the zone of relatively high temperature at the interior wall of the tube is utilized to a greater extent and the reaction is thus accelerated or made more efficient. This leads to the conversion of the starting material per unit of tube length being able to be improved. Furthermore, the improved mixing and equalization of the temperature profile in the reformer tube improves the often limited heat transport into the reformer tube and the reaction mixture, so that more heat power can be transferred per unit tube area and the throughput in the tube can be increased. A further advantage is that the tube wall temperature is decreased at the same throughput and less heating gas is consumed as a result.

In an advantageous embodiment of the reformer tube, the flow directing device is configured as one unit and the first guide device and the second guide device are combined and mechanically joined to one another within this unit. The flow directing device configured as one unit preferably does not encompass the tube wall but instead is a separate, essentially compact component. The advantage of this flow directing device is, in particular, that it can be installed in a tube when required or a reformer tube can be retrofitted with this flow directing device. The number and configuration of the flow directing devices used can vary as a function of the process parameters to be achieved in the reformer tube.

The first guide device and the second guide device are advantageously arranged between two planes which run essentially perpendicular to the longitudinal axis of the reformer tube in the flow directing device configured as one unit. This means that these two planes run in the region of the cross section of the reformer tube and not in a plane including the longitudinal axis thereof. The region of diversion of the partial volume streams is thus also preferably between these two abovementioned planes and thus in each case a layer of the reformer tube.

To obtain diverted partial volume streams having at least partially laminar or pressure drop-optimized flow, these are preferably not diverted perpendicularly from the longitudinal extension direction onto the longitudinal axis or in the direction of the tube wall, but instead essentially obliquely thereto.

In the projection of the diverted partial volume streams onto a cross-sectional area running perpendicular to the longitudinal axis of the reformer tube, the diverted partial volume streams should have a maximum deviation of 10°, in particular not more than 5° and in a particularly preferred embodiment not more than 2°, to the radial direction. Thus, for example, the first guide device and the second guide device are positioned at an angle of maximum 10°, preferably not more than 5°, and especially not more than 2° from the lower plane of the flow directing device.

In a further preferred embodiment of the reformer tube, the first guide device is positioned at a smaller distance from the longitudinal axis of the reformer tube than the second guide device. In a particularly preferred embodiment, the first guide device or first guide devices is/are arranged in a first circle or circular ring whose maximum diameter is smaller than that of a second circular ring in which the second guide device or second guide devices is/are arranged. The advantage of this embodiment is, in particular, that a partial volume stream which initially runs centrally is diverted in the direction of the interior wall of the tube and a partial volume stream running along the interior wall of the tube is diverted in the direction of the central region, i.e. onto the longitudinal axis of the reformer tube. As a result, unconsumed starting materials flow into the hot zone at the interior wall of the tube and synthesis gas formed there is conveyed away from this region again and volume is again made available in the region of elevated temperature, and unconsumed starting materials can again be introduced into this region to undergo reaction.

As a result of the first guide device being arranged more centrally in the tube than the second guide device, flow of the starting materials and the reaction products in the manner described is aided.

To achieve optimal flow, the flow directing device should have a plurality of first and second guide devices which extend radially and are in each case arranged alternately in adjacent angle sectors. This means that the flow directing device around the longitudinal axis of the reformer tube is preferably divided into equal-sized angle sectors, for example into eight angle sectors of 45° each. Four of these eight angle sectors each have a first guide device which in each case directs a partial volume stream in an outward direction, and four further sectors have two guide devices which direct the respective partial volume stream in an inward direction, with the various guide devices being arranged alternately in the angle sectors around the longitudinal axis. The respective radial extension of a guide device is defined by a channel-shaped element of the respective guide device.

The reformer tube of the invention can, furthermore, be configured so that it has a plurality of flow directing devices which are arranged at different positions in the longitudinal extension direction of the reformer tube, with first and second guide devices of the flow directing devices being arranged alternately in the longitudinal direction of the reformer tube in the same angle sectors. Here, too, the angle sectors are defined in the cross section of the reformer tube around its longitudinal axis. The advantage of this embodiment is, in particular, that as the starting materials and reaction products flow through the reformer tube, they are repeatedly directed away from the central region in the direction of the tube wall and conversely, so that the flow path through the reformer tube is lengthened and optimal mixing takes place and also improved utilization of the catalyst material occurs. In addition, carrying of unconsumed starting materials to the tube wall is favored so as to be able to react all starting materials accommodated in the tube. Furthermore, heat transport into the tube and the reaction mixture is again improved.

In a further advantageous embodiment of the reformer tube of the invention, the flow directing device thereof has a separation element for separating a volume stream present in the flow path before the respective flow directing device into the first partial volume stream and the second partial volume stream. The first partial volume stream flows in the central region of the reformer tube and is diverted in an outward direction by the flow directing device. The second partial volume stream flows in the peripheral region of the reformer tube and is diverted inward by the flow directing device. The separation element is preferably a tube section which is, when the guide devices are arranged in circular rings around the longitudinal axis, arranged coaxially to the circular rings and effects separation of the media between the first circular ring and the second circular ring, so that flowing media can be divided even before arriving at the flow directing device into an inner, first partial volume stream of the media and an outer, second partial volume stream of the media.

The invention additionally provides an apparatus for producing a synthesis gases, in particular for producing hydrogen or a hydrogen-rich gas, which has a reformer tube according to the invention and also a heating device for providing heat in order to heat the reformer tube and a membrane for separating off the hydrogen produced. The reformer tube of this apparatus preferably additionally has a catalyst material bed.

The invention further provides a process for producing a synthesis gas, in particular for producing hydrogen, in which starting materials and at least one reaction product flow as volume streams through a reformer tube according to the invention, where a first partial volume stream is conducted by a first guide device of a flow directing device in a direction having a radial component directed away from the longitudinal axis of the reformer tube and a second partial volume stream is conducted by a second guide device of the flow directing device in a direction having a radial component directed towards the longitudinal axis of the reformer tube. Preference is given to using methane, natural gas, propane or butane as starting materials.

This process is particularly advantageous because the first partial volume stream and/or the second partial volume stream flow around the catalyst material. The catalyst material serves to make possible or accelerate the reaction for producing the synthesis gas. Preference is given to using nickel-based or noble metal-based catalyst materials as bed materials or as structured packings.

The invention is illustrated below with the aid of the examples shown in the accompanying drawings.

BRIEF DESCRIPTION OF THE DRAWINGS

Further details and advantages of the invention will be illustrated by the description hereinafter of an exemplary embodiment shown in the figure, wherein.

Figure 1:
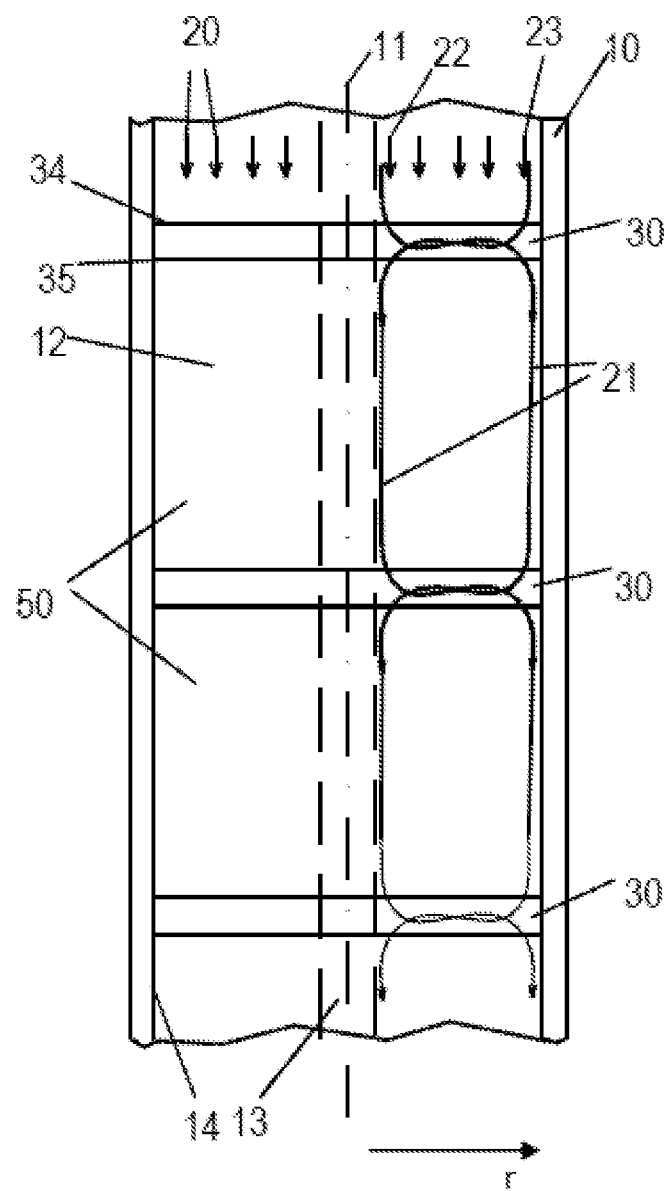
FIG. 1 illustrates a section of a reformer tube according to the invention.

The section of a reformer tube according to the invention depicted in FIG. 1 shows the volume flows or flow paths 21 in one half of the reformer tube 10 and not merely in the plane depicted. Generally, the internal diameter of the reformer tube is 4 to 5 inches. It can be seen from the section of a reformer tube 10 according to the invention shown in FIG. 1 that a plurality of flow directing devices 30 are arranged in the interior 12 perpendicular to the longitudinal axis 11 of the tube. However, the invention is not restricted to the arrangement of a plurality of flow directing devices 30 in the reformer tube 10, but a reformer tube 10 according to the invention can also have only one flow directing device 30.

A volume stream 20 flowing into the reformer tube 10 is divided by means of the respective flow directing device 30 into a first partial volume stream 22 which is present in the flow path upstream of the flow directing device 30 in the vicinity of the central region 13 of the reformer tube 10 and into a second partial volume stream 23 which is present in the vicinity of the interior wall 14 of the tube. The respective flow directing device 30 comprises a first guide device and a second guide device which are not shown in detail in FIG. 1. An illustrative arrangement and an embodiment of the first and second guide devices can be seen in FIGS. 2 to 4.

The flow directing device 30 or the first and second guide devices formed by it divert the first partial volume stream 22 from the central region 13 into the region close to the interior wall 14 of the tube and the second partial volume stream 23 from the region close to the interior wall 14 of the tube into the vicinity of the central region 13. This can be seen from the flow paths 21 shown in FIG. 1.

As a result of the reformer tube 10 being heated from the outside, the tube wall of the reformer tube 10 and also the region at the interior wall 14 of the tube and catalyst material 50 located there have a higher temperature than the central region 13 or the catalyst material 50 located there. However, the reaction to produce synthesis gas proceeds quicker and more efficiently, the higher the temperature. This means that more synthesis gas is formed per unit time in the vicinity of the interior wall 14 of the tube than in the central region 13. As a result of starting materials in the first partial volume stream 22 being diverted from the central region 13 to the interior wall 14 of the tube by means of the flow directing devices 30, these starting materials are converted into synthesis gas because of the higher temperature prevailing at the interior wall 14 of the tube. Synthesis gas 14 formed there is once again conveyed into or close to the central region 13 by the next flow directing device 30 in the second partial volume stream 23 in the flow path 21 in order to provide space into which essentially unconsumed starting materials in the first partial volume stream 22 can be conveyed again.

As a result, no starting materials flow unconsumed through the reformer tube but instead all starting materials introduced are optimally converted into synthesis gas. In addition, the flow path 21 in the reformer tube 10 is lengthened, so that the catalyst material 50 present in the reformer tube 10 is optimally utilized.

Figure 2:
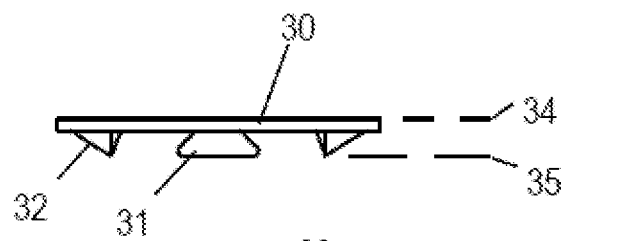
FIG. 2 illustrates a flow directing device seen from the side.
Figure 3:
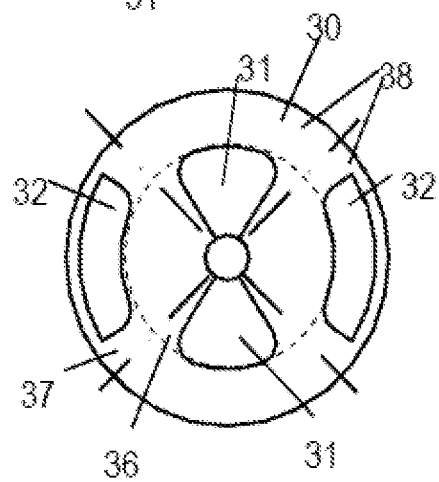
FIG. 3 illustrates a flow directing device seen from above.
Figure 4:
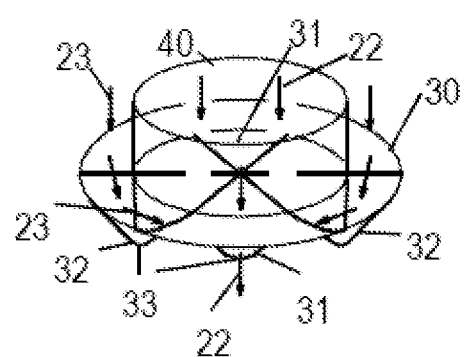
FIG. 4 illustrates a flow directing device in a perspective view.

A flow directing device 30 can be seen in FIGS. 2 to 4. In particular, when FIGS. 2 and 3, which show the same flow directing device 30, are looked at together, it can be seen that the flow directing device 30 has two first guide devices 31 which are arranged in a first, central circular ring 36 and two second guide devices 32 which are arranged in a second, larger circular ring 37. The two first guide devices 31 are each formed by surfaces projecting obliquely from the central region. The two second guide devices 32 are formed by corresponding shaped elements projecting from the outside of the second circular ring 37. When the essentially rotationally symmetric flow directing device 30 is divided into the four angle sectors 38 shown, a guide device 31, 32 is arranged in each of these angle sectors 38. Here, the flow directing device present is, according to the invention, not restricted to only four angle sectors 38 and the arrangement of in each case one guide device 31, 32 in an angle sector 38, but the flow directing device 30 can instead have more than four angle sectors, with a guide device being arranged in each angle sector 38 in such an embodiment.

In FIG. 2 in particular, it can be seen that the flow directing device 30 has such a configuration that the first guide devices 31 and also the second guide devices 32 extend between a first plane 34 and a second plane 35, with the first guide devices 31 and second guide devices 32 being mechanically joined to one another via the first circular ring 36 and the second circular ring 37. This leads to a compact construction of the flow directing device 30, so that it can be used in a simple manner in a conventional reformer tube, as shown in FIG. 1.

It can be seen from FIG. 4 that the flow directing device 30 can be configured with an additional separation element 40 which is configured essentially as a tube or hollow cylinder section and is arranged coaxially with the first circular ring 36 and the second circular ring 37, with the tube wall of this separation element 40 being arranged essentially at the outer periphery of the first circular ring 36 or on the interior periphery of the second circular ring 37. This separation element 40 allows an inflowing volume stream to be divided into the first, central partial volume stream 22 and the second partial volume stream 23 running in the outer region. As can be seen from FIG. 4, the second partial volume stream 23 is diverted by the respective second guide device 32 from the outer region in the direction of the center of the flow directing device 30. The first partial volume stream 22 is conveyed from the central region in the direction of the periphery of the flow directing device 30 by the respective first guide device 31, so that overall flow paths 21 as shown in FIG. 1 are established. To achieve reliable diversion of the flow and also flow with a radial component, the first guide device 31 and the second guide device 32 each have channel-shaped elements 33 along which the media of the partial volume streams are conveyed.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application DE 10 2013 020 856.4, filed Dec. 12, 2013, are incorporated by reference herein.

| List of reference numerals | |
|---|---|
| Reformer tube | 10 |
| Longitudinal axis | 11 |
| Interior space | 12 |
| Central region | 13 |
| Interior wall of the tube | 14 |
| Volume stream | 20 |
| Flow path | 21 |
| First partial volume stream | 22 |
| Second partial volume stream | 23 |
| Flow directing device | 30 |
| First guide device | 31 |
| Second guide device | 32 |
| Channel-shaped element | 33 |
| First plane | 34 |
| Second plane | 35 |
| First circular ring | 36 |
| Second circular ring | 37 |
| Angle sector | 38 |
| Separation element | 40 |
| Catalyst material | 50 |

The invention claimed is:

1. A reformer tube for conducting the flow of starting materials and at least one reaction product in volume streams, said reformer tube comprising:
at least one flow directing device (30) within the interior (12) of said reformer tube (10), said at least one flow directing device (30) having a first guide device (31) for diverting a first partial volume stream (22) in a direction having a radial component directed away from the longitudinal axis (11) of the reformer tube (10) and having a second guide device (32) for diverting a second partial volume stream (23) in a direction having a radial component directed towards the longitudinal axis (11) of the reformer tube (10), and
a bed of catalyst material (50) positioned within the interior (12) of said reformer tube downstream of said at least one flow directing device (30),
wherein said first guide device (31) is positioned at a smaller distance from the longitudinal axis (11) of said reformer tube (10) than said second guide device (32).

2. The reformer tube according to claim 1, wherein said tube is used for producing a synthesis gas.

3. The reformer tube according to claim 1, wherein said flow directing device (30) is configured as one unit and the first guide device (31) and the second guide device (32) are combined within said unit, with the first and second guide devices (31,32) being mechanically joined to one another within the unit.

4. The reformer tube according to claim 3, wherein said first guide device (31) and said second guide device (32) are arranged between two planes (34,35) which are substantially perpendicular to the longitudinal axis (11) of said reformer tube (10) in said flow directing device (30).

5. The reformer tube according to claim 1, wherein said flow directing device is divided into angle sectors (38) around the longitudinal axis of said reformer tube, and said flow directing device (30) has a plurality of first and second guide devices (31,32) which extend radially and are each arranged alternately in neighboring angle sectors (38).

6. The reformer tube according to claim 1, wherein said flow directing device is divided into angle sectors (38) around the longitudinal axis of said reformer tube, and said reformer tube (10) has a plurality of flow directing devices (30) which are arranged at different positions in the longitudinal extension direction of said reformer tube (10), with first and second guide devices (31,32) being arranged alternately in the longitudinal direction of said reformer tube (10) in the same angle sectors (38).

7. The reformer tube according to claim 1, wherein said flow directing device (30) further comprises a separation element (40) for separating a volume stream present in the flow path before said flow directing device (30) in said reformer tube (10) into the first partial volume stream (22) and the second partial volume stream (23).

8. An apparatus for producing a synthesis gas, comprising: a reformer tube (10) according to claim 1, a heating device for providing heat in order to heat said reformer tube (10), and also a membrane for separating off synthesis gas produced in said reformer tube (10).

9. A process for producing a synthesis gas, said process comprising:
flowing starting materials and at least one reaction product in volume streams through a reformer tube 10 according to according to claim 1,
wherein the first partial volume stream (22) is conducted by said first guide device (31) of said flow directing device (30) in a direction having a radial component directed away from the longitudinal axis (11) of said reformer tube (10) and the second partial volume stream (23) is conducted by said second guide device (32) of said flow directing device (30) in a direction having a radial component directed towards the longitudinal axis (11) of said reformer tube (10).

10. The process for producing a synthesis gas according to claim 9, wherein said a first a bed of said catalyst material (50) is positioned upstream of said at least one flow directing device (30) and a second bed of said catalyst material (50) is positioned downstream of said at least one flow directing device (30), and said first and/or second partial volume stream (22,23) flows around said second bed of catalyst material (50) in said reformer tube (10).

11. The process for producing a synthesis gas according to claim 9, wherein said synthesis gas is hydrogen.

12. The reformer tube according to claim 1, wherein said first guide device and said second guide device are positioned at an angle of maximum 10° from the radial direction of said reformer tube.

13. The reformer tube according to claim 1, wherein said at least one flow directing device (30) comprises a first circle and a second circular ring positioned around said first circle, and said first guide device is arranged in said first circle and said second guide device is arranged in said second circular ring.

14. The reformer tube according to claim 13, wherein a plurality of first guide devices are arranged in said first circle and a plurality of second guide devices are arranged in said second circular ring.

15. The reformer tube according to claim 14, wherein said flow directing device is divided into angle sectors (38) around the longitudinal axis of said reformer tube, and said first and second guide devices (31,32) are each arranged alternately in neighboring angle sectors (38) and extend radially within each of said sectors.

16. The reformer tube according to claim 13, wherein said flow directing device (30) further comprises a separation element (40) for separating a volume stream present in the flow path before said flow directing device (30) in said reformer tube (10) into the first partial volume stream (22) and the second partial volume stream (23), said separation element (40) being positioned between said first circle and said second circular ring.

17. The reformer tube according to claim 16, wherein said separation element is a tube section which is arranged coaxially with said first circle and said second circular ring.

18. The reformer tube according to claim 1, wherein said first guide device (31) diverts the first partial volume stream (22) from a central region (13) of said reformer tube to a region close to the interior wall (14) of said reformer tube, and said second guide device (32) diverts the second partial volume stream (23) from the region close to the interior wall (14) of said reformer tube to the central region (13) of said reformer tube.

19. The reformer tube according to claim 1, wherein said reformer tube 10 comprises a first a bed of catalyst material (50) positioned upstream of said at least one flow directing device (30) and a second bed of catalyst material (50) positioned downstream of said at least one flow directing device (30).

* * * * *